(12) United States Patent
Zhang et al.

(10) Patent No.: US 10,747,672 B2
(45) Date of Patent: Aug. 18, 2020

(54) MANAGING A DATALOG SPACE OF A DATA CACHE

(71) Applicant: EMC IP Holding Company LLC, Hopkinton, MA (US)

(72) Inventors: Leon Zhang, Beijing (CN); Lester Zhang, Beijing (CN); Chen Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 169 days.

(21) Appl. No.: 15/955,028

(22) Filed: Apr. 17, 2018

(65) Prior Publication Data

US 2018/0307610 A1    Oct. 25, 2018

(30) Foreign Application Priority Data

Apr. 17, 2017    (CN) .......................... 2017 1 0250596

(51) Int. Cl.
*G06F 12/0871*    (2016.01)
*G06F 13/12*    (2006.01)
*G06F 13/16*    (2006.01)

(52) U.S. Cl.
CPC ........ *G06F 12/0871* (2013.01); *G06F 13/126* (2013.01); *G06F 13/1642* (2013.01); *G06F 2212/222* (2013.01)

(58) Field of Classification Search
CPC ............... G06F 12/0871; G06F 13/126; G06F 13/1642; G06F 13/1673; G06F 2212/222
See application file for complete search history.

(56) References Cited

U.S. PATENT DOCUMENTS

| | | | |
|---|---|---|---|
| 6,523,098 B1 * | 2/2003 | Anderson | G06F 13/161 711/156 |
| 10,025,510 B1 | 7/2018 | Koli et al. | |
| 10,061,540 B1 | 8/2018 | Koli et al. | |
| 10,146,454 B1 | 12/2018 | Koli et al. | |
| 10,353,588 B1 | 7/2019 | Koli et al. | |
| 10,514,861 B1 | 12/2019 | Basov et al. | |
| 10,521,400 B1 | 12/2019 | Basov et al. | |
| 2011/0119442 A1 * | 5/2011 | Haines | G06F 12/0246 711/113 |

* cited by examiner

*Primary Examiner* — Larry T Mackall
(74) *Attorney, Agent, or Firm* — BainwoodHuang

(57) ABSTRACT

Embodiments of the present disclosure relate to a method and device and computer readable medium for storage management. The method comprises determining a queuing condition of I/O requests of a cache of a first file system in a storage, the cache including at least one flash block. The method further includes determining a load condition of the cache based on the queuing condition of the I/O requests. Moreover, the method further includes in response to determining that the cache is in a busy status, allocating to the cache at least one additional flash block from a second file system in the storage, the second file system being different from the first file system.

20 Claims, 10 Drawing Sheets

MANAGING A DATALOG SPACE OF A DATA CACHE

RELATED APPLICATIONS

This application claim priority from Chinese Patent Application Number CN201710250596.4, filed on Apr. 17, 2017 at the State Intellectual Property Office, China, titled "METHOD, APPARATUS, AND COMPUTER READABLE MEDIUM FOR STORAGE MANAGEMENT" the contents of which is herein incorporated by reference in its entirety.

FIELD

Embodiments of the present disclosure generally relate to the field of data storage, and more specifically, to a method, device and computer readable medium for storage management.

BACKGROUND

During the process of development of computer technology, the access speed of the master memory has always been much slower than the processing speed of the central processing unit CPU such that the high-speed processing capability of the CPU cannot be fully exploited, thus causing the working efficiency of the entire computer system to be affected. To alleviate speed mismatch between the CPU and the master memory, one of the common approaches is to use cache at the storage layer. The cache is a layer-1 memory existing between the master memory and the CPU. It has a smaller capacity but much higher access speed than the master memory, which is close to the processing speed of the CPU.

However, in current actual application, although a cache is disposed between the master memory and the CPU, when a large amount of I/O requests are performed for cache, the problem of severe degradation of system performance is still likely to arise. For example, when a large amount of I/O writing operations are performed for the cache, the general practice is to write all the data into the cache without considering the size of the amount of the written data. When the amount of data written into the cache is large (for example, larger than 250K), since the capacity of the cache is small, it is easily filled such that the subsequent I/O requests have to be queued up, hence causing the performance of the whole system to decline severely.

SUMMARY

Embodiments of the present disclosure provide a method and device and computer readable medium for storage management.

In a first aspect of the present disclosure, a method of storage management is provided. The method including: determining a queuing condition of I/O requests for a cache of a first file system in a storage, the cache including at least one flash block; determining a load condition of the cache based on the queuing condition of the I/O requests; and in response to determining that the cache is in a busy status, allocating to the cache at least one additional flash block from a second file system in the storage, the second file system being different from the first file system.

In a second aspect of the present disclosure, a device for storage management is provided. The device comprising: at least one processing unit; and at least one memory coupled to the at least one processing unit and storing instructions executable by the at least one processing unit, the instructions, when executed by the at least one processing unit, causing the device to perform acts including: determining a queuing condition of I/O requests of a cache of a first file system in the storage, the cache including at least one flash block; determining a load condition of the cache based on the queuing condition of the I/O requests; and in response to determining that the cache is in a busy status, allocating to the cache at least one additional flash block from a second file system in the storage, the second file system being different from the first file system.

In a third aspect of the present disclosure, a computer readable storage medium is provided. The computer readable storage medium has computer readable program instructions stored thereon, the computer readable program instructions, when executed by a processing unit, causing the processing unit to perform the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through more detailed description to exemplary embodiments in combination with the accompanying drawings, the above and other objectives, features, and advantages of the present disclosure will become more apparent. In exemplary embodiments of the present disclosure, the same reference numbers usually represent the same components.

In all the drawings, the same or corresponding reference symbols refer to the same or corresponding elements.

DETAILED DESCRIPTION OF EMBODIMENTS

Figure 1:
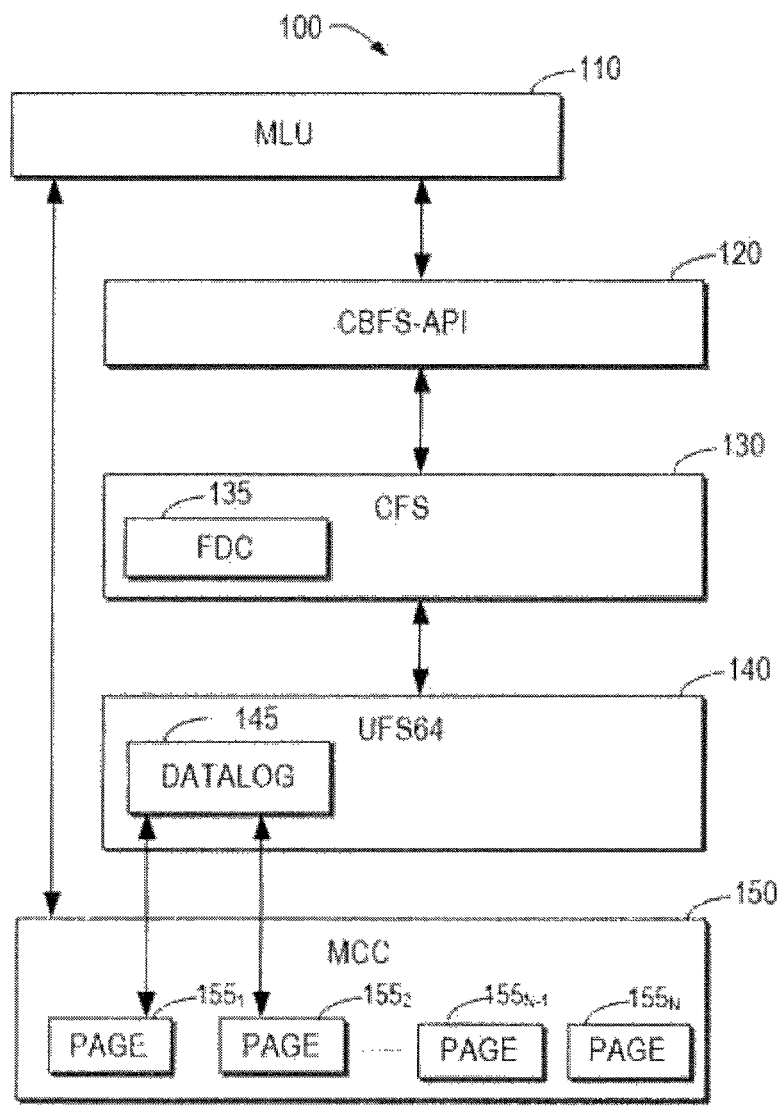
FIG. 1 shows a block diagram of a system 100 for storage management according to the embodiments of the present disclosure.

Preferred embodiments of the present disclosure will be described in the following text in greater detail with reference to the drawings. Although preferred embodiments of the present disclosure are displayed in the drawings, it should be understood that the present disclosure can be implemented in various manners, and will not be limited by the embodiments shown herein. On the contrary, these embodiments are provided to make the present disclosure more thorough and complete, and are able to convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least another embodiment." Terms "first," "second," and others can denote different or identical objects. The following text may also contain other explicit or implicit definitions.

As described above, when a large amount of I/O requests are performed for a cache, a series of problems, such as severe degradation of system performance, may arise. To at least partially solve one or more of the above problems and other potential problems, example embodiments of the present disclosure provide a method and device and computer readable medium for storage management. According to the present disclosure, a novel, flexible and dynamic method is introduced for managing a datalog space of permanent file data cache (PFDC) with respect to workload of a file system from changed I/O flow for better I/O throughput and better flash memory resource utilization efficiency.

FIG. 1 shows a block diagram of a system 100 for storage management according to the embodiments of the present disclosure. It shall be understood that the structure and functions of system 100 shown in FIG. 1 are only for illustrative purpose, rather than to suggest any limitation to the scope of the present disclosure. Embodiments of the present disclosure may be embodied in different structures and/or functions.

According to the embodiments of the present disclosure, system 100 may be a basic PFDC component of a uniform file system, which is used for improving writing performance of the I/O requests, namely, realizing high I/O request throughput and low latency. In the PFDC component, data are firstly written onto a fast persistent storage DATALOG in a trivial format, and I/O requests are then returned. Later in the backstage, data are stored in a file system permanently through separate flushing threads.

As shown by FIG. 1, system 100 may include a mapping logic unit (MLU) 110, a common block device file system-application programming interface (CBFS-API) 120, a common file system (CFS) 130, a unified file system (UFS64) 140 and a multi-core cache (MCC) 150. Besides, the common file system 130 may further include a file data cache (FDC) 135, and the unified file system 140 may further include a datalog (DATALOG) 145, and the multi-core cache 150 may further include pages $155_1, 155_2 \ldots 155_{N-1}, 155_N$ (collectively referred to as "pages" 155), where N is a natural number.

The common file system 130 is a layer providing an application programming interface to only access dirty data in the PFDC (namely, data in the file data cache 135). The common file system 130 maps the data block <file system id, file, offset> to the cache descriptor (FDC entry) of the dirty data block. A single FDC entry maps data of 32 kb (4×8 kb). One FDC entry maps multiple layers of snap's data blocks. The datalog 145 is a layer for managing a disk structure of dirty data blocks stored in the PFDC. The datalog 145 provides a basic application programming interface to allocate/release disk space in a manner of major cycle. Two flash blocks are used to store dirty data.

The datalog 145 is also responsible for store dirty data to its final destination in the file system space in a manner of consistency and at the adequate time, and for mapping them to the file mapping layer. It is also responsible for restoring the state of the PFDC (replay) during the assembly. The application programming interface 120 of the common block device file system corresponds to a file system manager. The application programming interface 120 of the common block device file system provides an application programming interface to access and manage files and maintain consistency of the mapping of files. The multi-core high speed cache 150 provides a set of new application programming interfaces for the PFDC and a set of disparate writing application programming interfaces to move with ACID. Disparate writing consists of atomically executing a plurality of I/O requests together. ACID movement includes copying data only through switching pages without performing memcpy. The mapping logic unit 110 integrates the new different writing application programming interfaces and new different writing recycling functions to perform renaming+zeroing of the datalog header. Internal linking compression (ILC) is involved in the system 100. Internal linking compression is created in PFDC and compresses data blocks during PFDC flushing cycle. Blocks returned to the datalog will be retrieved and compressed into buffer cache pages and finally be written into the file system and a backup storage bank.

The mapping logic unit 110 may communicate with the application programming interface 120 of the common block device file system and the multi-core cache 150. The application programming interface 120 of the common block device file system may communicate with the common file system 130 which may communicate with the unified file system 140, and the datalog 145 in the unified file system 140 may communicate with the pages 155 in the multi-core cache 150. It shall be noted that the specific names and/or protocols of various components in the system described herein are only to assist those skilled in the art to better understand the ideas of the present disclosure, rather than to limit the scope of the present disclosure in any manner. Moreover, more or better components may be included in other embodiments, or alternative components having the same or similar functions may be included in other embodiments.

Figure 2:
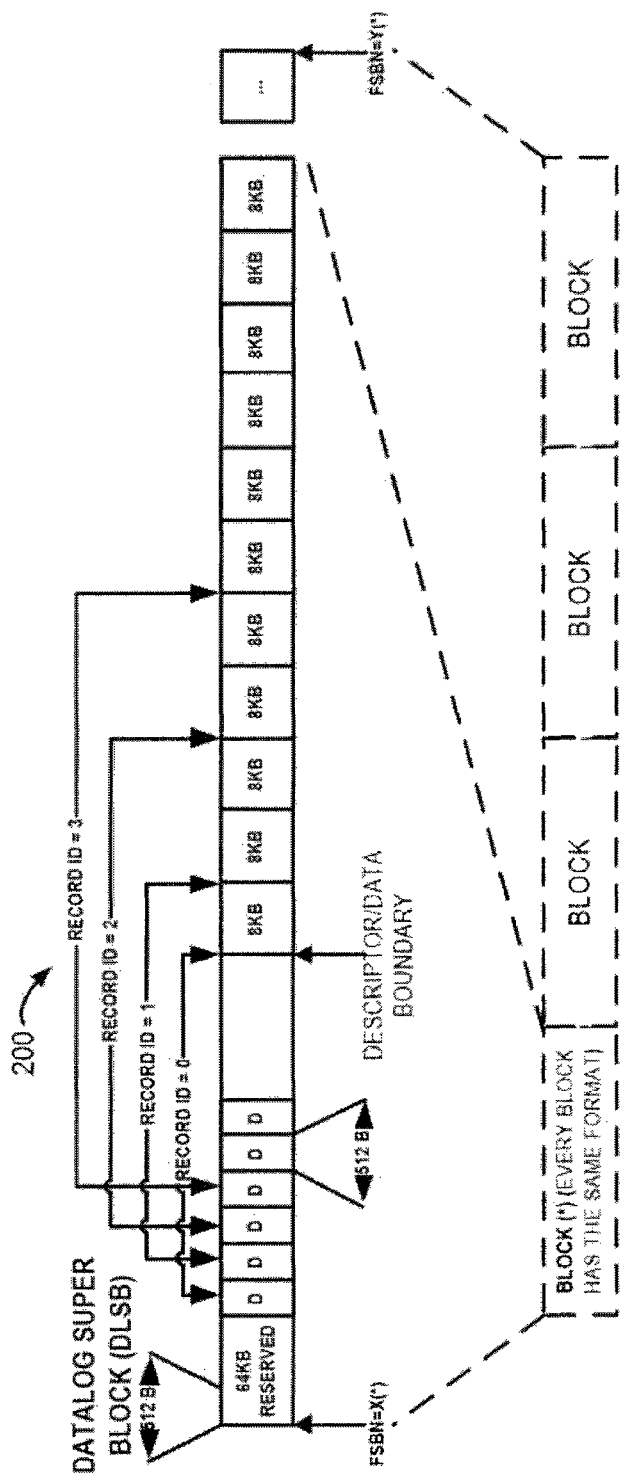
FIG. 2 shows a schematic diagram of a datalog disk layout 200 for system 100 according to the embodiments of the present disclosure.

FIG. 2 shows a schematic diagram of a datalog disk layout 200 for system 100 according to the embodiments of the present disclosure. It shall be appreciated that the datalog disk layout 200 as shown by FIG. 2 is only for the purpose of illustration, rather than to suggest any limitation to the scope of the present disclosure. Other datalog disk layouts for the system 100 may be utilized in the embodiments of the present disclosure.

As shown by FIG. 2, each I/O request logically has a matched datalog descriptor and its header part and data part are stored respectively into the datalog header space and datalog data space of some blocks (divided by the arrow marked as "descriptor/data boundary" in FIG. 2). The header parts and data parts of all (two) flush blocks are indexed respectively with a global log ID: given a header or a datalog ID, and the related flash blocks are firstly located, and then offsets in the blocks that are located. Moreover, both the header space and the data space have references to their headers and tails to identify the usage scope of their whole datalogs.

Some specific numeral values are involved in FIG. 2 and the specification of the present disclosure, for example, 512 KB or 8 KB. It shall be understood that the specific values recited in the specification and drawings of the present disclosure are all illustrative, rather than to suggest any limitation to the scope of the present disclosure in any manner.

Figure 3:
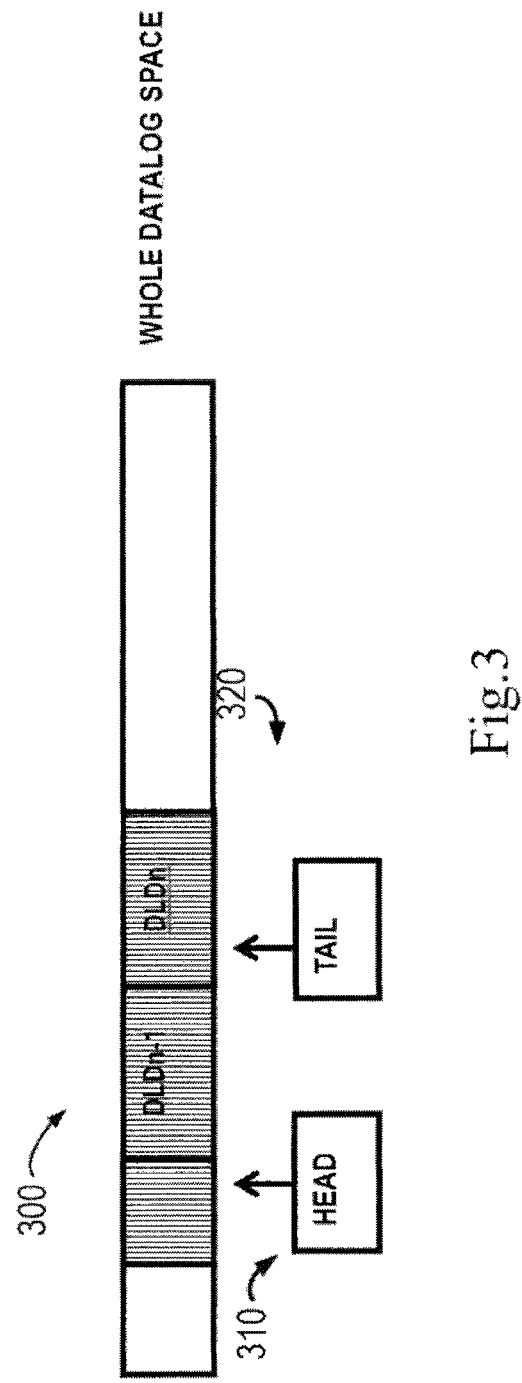
FIG. 3 shows a schematic diagram of an overall datalog space 300 for system 100 according to the embodiments of the present disclosure.

FIG. 3 shows a schematic diagram of an overall datalog space 300 for system 100 according to the embodiments of the present disclosure. It shall be understood that the overall datalog space 300 as shown by FIG. 3 is only for illustrative purpose, rather than to suggest any limitation to the scope of the present disclosure. Other overall datalog space for system 100 may be used in embodiments of the present disclosure.

As shown by FIG. 3, the used range (dark color) of the whole datalog space is occupied by datalog descriptors matched with some I/O requests, wherein each has a header 310 (512 KB)+a data part 320 (several 8 KBs).

In the current PFDC solution, because only two stabilizing blocks (each having a size of 256 MB, for example) are allocated for incoming I/O requests, if PFDC flush throughput slows down due to internal linking compression (or deleting repetition) under the heavy load of I/O requests, then it is very easy for the whole datalog space to be full. Then the subsequent I/O requests have to be queued up or be suspended, and the I/O request throughput is degraded and some I/O requests will sometimes be time out. Meanwhile, the flash blocks of those idle file systems are wasted and are not used to ease those busy file systems.

The traditional solution only tunes internal I/O request scheduling programs to prevent those I/O requests with higher priority from being queued up or being suspended for the longest time for service, which, however, helps little. However, the fundamental problem of resource shortage is not solved: when the heavy I/O request work load occurs, there are no sufficient flash blocks to buffer/cache the incoming I/O requests. Therefore, unless all the file systems are busy at the same time in a unified storage, the existing flash blocks in the unified storage may be used to achieve better I/O request processing performance.

For the ease of depiction, the file data cache 135 and the datalog 145 may form a permanent file data cache (PFDC) as the "cache" involved herein. This is because the storage medium for storing the datalog 145 has the characteristic of not losing data when powers down, and thus can further improve stability of the file system. It should be noted that the "cache" involved herein may also refer to the concept of cache commonly known in the art.

Figure 4:
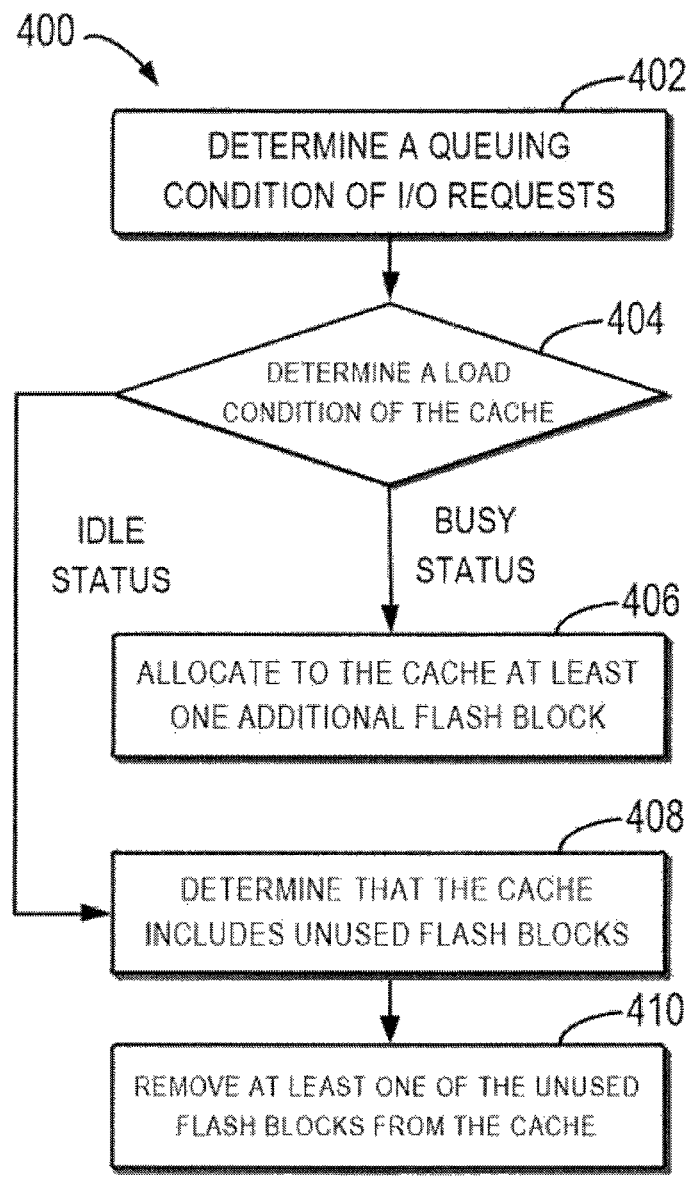
FIG. 4 shows a flowchart of a method 400 of storage management according to the embodiments of the present disclosure.

The example embodiments of the present disclosure will be described blow in detail with reference to FIGS. 4-10. FIG. 4 shows a flowchart of an example method 400 of storage management according to the embodiments of the present disclosure. For example, the method 400 may be executed by the system 100 for storage management as shown by FIG. 1. It shall be understood that method 400 may include additional steps that are not shown or omit the shown steps, and the scope of the present disclosure is not limited in this regard.

In the example embodiments of the present disclosure described with reference to FIGS. 4-10, each file system only reserves at least one (generally one or two, or more) flash block initially to satisfy the basic/initial performance requirement for incoming I/O requests. When the workload of the file system becomes heavy, more flash blocks will be allocated dynamically to implement the expansion scenario of the flash blocks. Meanwhile, if the workload becomes lighter for a period of time, then those additional flash blocks will be released to implement the shrink scenario of the flash blocks.

At block 402, the queuing condition of the I/O requests of the cache of the first file system in the storage is determined. In some embodiments, determining the queuing condition of the I/O requests may include detecting whether the cache is full when new I/O requests are to be written into the cache as datalogs. If the cache is full, then the queuing condition of the I/O requests will be further checked.

Continue to refer to FIG. 4. At block 404, the load condition of the cache is determined based on the queuing condition of the I/O requests. According to the embodiments of the present disclosure, determining the load condition of the cache includes determining whether the cache is in a busy status or an idle status.

In some embodiments, in response to the number of I/O requests queued for the cache reaching a first threshold number, the cache is determined to be in the busy status. Because it takes some time for the file system in the storage to process each queued I/O request, when the number of queued I/O requests is large, the queuing state of I/O requests will last for quite a long time. Therefore, it can be determined that the cache will be in the busy status for quite a long time. According to some embodiments of the present disclosure, when it is determined that the cache is in the busy status only through the number of queued I/O requests, the numeral value of the first threshold is generally set to be rather large.

In some embodiments, in response to the number of I/O requests queued for the cache reaching a second threshold number for a first period of time longer than a predetermined length, it can be determined that the cache is in the busy status. In these embodiments, the first period of time should exceed the predetermined length to avoid determining too frequently that the cache is in the busy status and performing subsequent operations, which is for the purpose of avoiding the load and overhead brought by frequent subsequent operations to the file system and the storage. In these embodiments, because the number and predetermined length of queued I/O requests are considered comprehensively, it can be set more precise and further determined that the cache is in the busy status. Therefore, according to some embodiments of the present disclosure, when the number of I/O requests queued for the cache for the first period of time is used to determine that the cache is in the busy status, the numeral value of the above second threshold can be configured smaller than the above first threshold.

According to some embodiments of the present disclosure, determining that the cache is the busy status through the number of I/O requests queued for the cache for the first period of time longer than the predetermined length may be modified as determining through the following acts:

1) When new I/O requests for the cache are received, detecting whether the cache is full. When the cache is full, proceeding to act 2), otherwise, exiting the current act and waiting for the next receipt of the new I/O requests for the cache.

2) Adding a counter (F) for the queued I/O requests, and proceeding to act 3).

3) Checking the current time (Ct) and the statistics starting time (Cs); if (Ct−Cs)>=R (a configured time range used for counting the queued I/Os), then proceeding to act 4), otherwise, exiting the current act and waiting for the next receipt of the new I/O requests for the cache. In this act, R is, namely, the predetermined length configured for avoiding determining too frequently that the cache is in the busy status and performing subsequent operations.

4) If F/(Ct−Cs) is larger than the threshold (T1), then determining that the cache is in the busy status for the period of time with a length larger than R, resetting F(F=0), Ct=Cs, otherwise, determining that the cache is not in the busy status for the period of time with a length larger than R, resetting F(F=0), Ct=Cs.

Continue to refer to FIG. 4. At block 406, in response to determining that the cache is in the busy status, at least one additional flash block is allocated to the cache. According to some embodiments of the present disclosure, to realize dynamic allocation of flash blocks among different file systems in the unified storage, the above at least one additional flash block are from a second file system in the storage, wherein the second file system is different from the first file system and may be multiple.

According to some embodiments of the present disclosure, when at least one additional flash block is allocated to the cache, if the cache itself contains N flash blocks, M additional flash blocks are allocated to the cache, wherein M and N are natural numbers and M is a multiple of N. Such a manner of allocating flash blocks according to multiple is used to achieve an effect of facilitating calculation. According to some embodiments of the present disclosure, when at least one additional flash block is allocated to the cache, if the cache itself contains N flash blocks, N additional flash blocks are allocated to the cache, and then the number of flash blocks in the cache becomes doubled.

Figure 5:
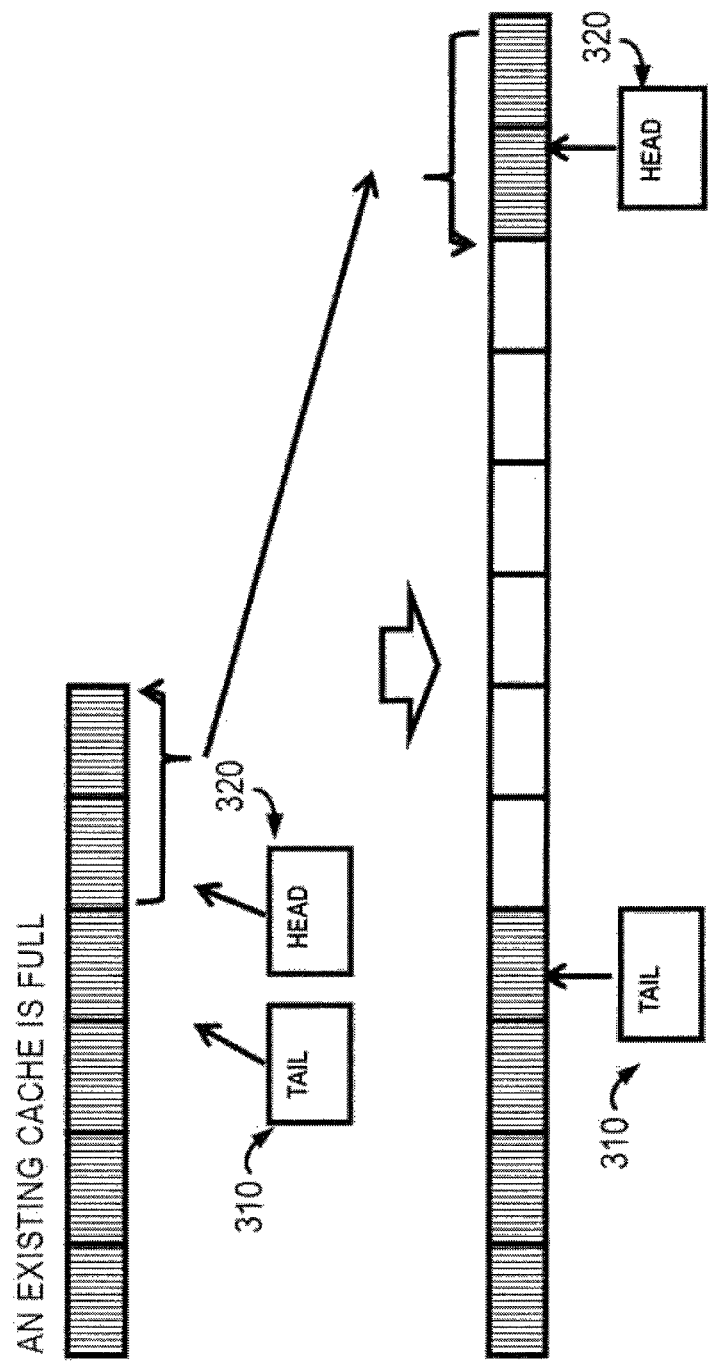
FIG. 5 shows a schematic diagram of a first manner of configuring allocated flash blocks for the method 400 according to the embodiments of the present disclosure.
Figure 6:
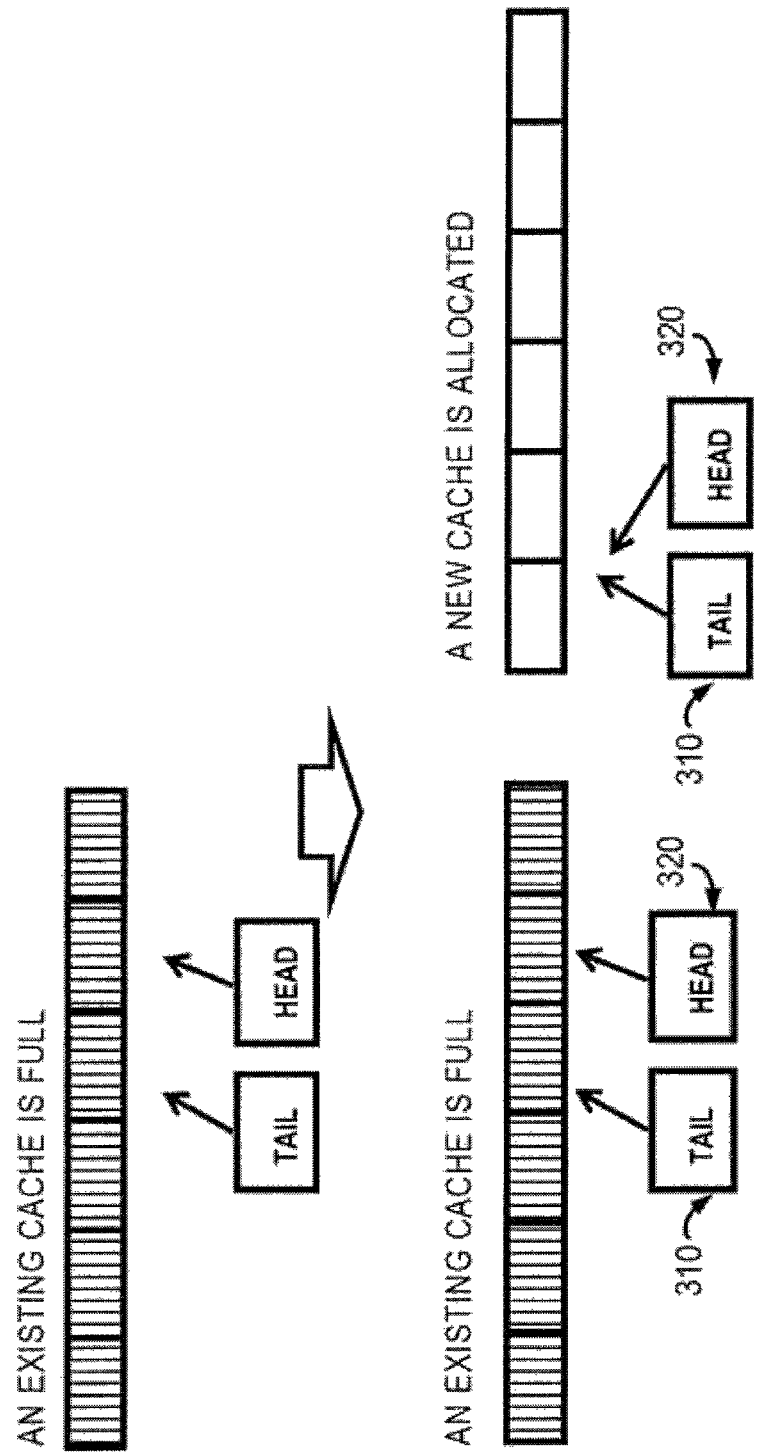
FIG. 6 shows a schematic diagram of a second manner of configuring allocated flash blocks for the method 400 according to the embodiments of the present disclosure.

According to some embodiments of the present disclosure, when additional flash blocks are allocated to the cache, the allocated additional flash blocks may be configured in the manner as shown in FIG. 5 or FIG. 6. Therefore, FIGS. 5 and 6 may be considered as elaboration or complement to block 406 of FIG. 4.

FIG. 5 shows a schematic diagram of a first manner of configuring allocated flash blocks for the method 400 according to the embodiments of the present disclosure. As shown by FIG. 5, when the allocated additional block memory blocks are configured, the allocated additional flash blocks and the original flash blocks of the cache are combined as an integral new cache. In some embodiments, this process may include the following acts:

1) Locking the whole cache.
2) Moving the tail of the original datalog data from the tail of the original flash block to the tail of the new flash block to extend the cache.
3) Setting the correct head pointer based on the current extended cache.
4) Scanning all the original datalogs in the PFDC cache and updating them with the newest locating information of their newly extended datalogs.
5) Unlocking the whole datalog When the first manner of configuring the allocated flash blocks shown in FIG. 5 is adopted, because the allocated additional flash blocks and the original flash blocks of the original cache are combined to form the new cache, the operations of subsequently processing I/O requests and the operations of processing the original flash blocks of the original cache are the same.

FIG. 6 shows a schematic diagram of a second manner of configuring allocated flash blocks for the method 400 according to the embodiments of the present disclosure.

As shown by FIG. 6, when the allocated additional flash blocks are configured, the allocated additional flash blocks are not combined with the original flash blocks of the cache as an overall new cache. This process may include the following acts:

1) Applying new flash blocks to create a new datalog space and initializing it.
2) Adding an overall datalog space counter such that other incoming IOs can try and choose the new datalog space.

When the second manner of configuring the allocated flash blocks shown in FIG. 6 is adopted, because the allocated additional flash blocks are not combined with the original flash blocks of the cache as the overall new cache, it is necessary to adopt the manner of setting the overall datalog space counter such that the incoming I/O requests can be allocated properly to the original flash blocks or the allocated additional flash blocks. Meanwhile, because the allocated additional flash blocks and the original flash blocks of the cache are not combined, some acts as described above with reference to FIG. 5 are omitted such that the act of configuring the allocated additional flash blocks is simplified.

Continue to refer to FIG. 4. At block 408, in response to determining that the cache is in the idle status based on the queuing condition of the I/O requests, it is determined that whether the cache includes unused flash blocks.

In some embodiments, in response to queued I/O requests for the cache not existing for the second period of time, it can be determined that the cache is in the idle status. Because when the cache is in the idle status, I/O requests queued for the cache definitely do not exist, it is possible to determine that the cache is in the idle status when I/O requests queued for the cache do not exist for a particular period of time, so as to further determine whether the cache includes unused flash blocks.

In some embodiments, in response to the number of I/O requests completed for the cache for a third period of time failing to reach a third threshold, it can be determined that the cache is in the idle status. In these embodiments, it is possible to configure the third threshold number to adjust the frequency of determining that the cache is in the idle status. Meanwhile, because this manner takes both of the length of the third period of time and the number of completed I/O requests into consideration, the precision of determination is generally higher than the previous manner.

According to some embodiments of the present disclosure, determining that the cache is in the idle status through the number of I/O requests completed for the cache for the third period of time may be modified as determining through the following acts:

1) Adding a global I/O counter (N) value after each I/O request is completed;
2) Checking N by, for instance, an independent backend thread, after the completion of each predetermined time interval (I), if N/I is smaller than the threshold (T2), then determining that the cache is in the idle status for the past period of time, otherwise, determining that the cache is not in the idle status for the past period of time.

Continue to refer to FIG. 4. At block 410, in response to the cache not including unused flash blocks, at least one unused flash block is removed from the cache. According to some embodiments of the present disclosure, to realize dynamic allocation of flash blocks among different file systems of the unified storage, it is possible not to remove the at least one unused flash block from the cache immediately in response to the cache including unused flash blocks, but to allocate the above at least one unused flash block to a cache of another file system in the busy status when the cache of the other file system in the unified storage is in the busy status.

According to some embodiments of the present disclosure, when at least one unused flash block is removed from the cache, in response to determining the flash blocks in a plurality of flash blocks exceeding a predetermined number as unused flash blocks, a predetermined number of unused flash blocks are removed from the cache. According to the embodiments of the present disclosure, when the cache includes N flash blocks and more than N/2 flash blocks are determined as unused flash blocks, N/2 (when N is an even number) or (N−1)/2 or (N+1)/2 (when N is an odd number) of flash blocks are removed from the cache.

Figure 7:
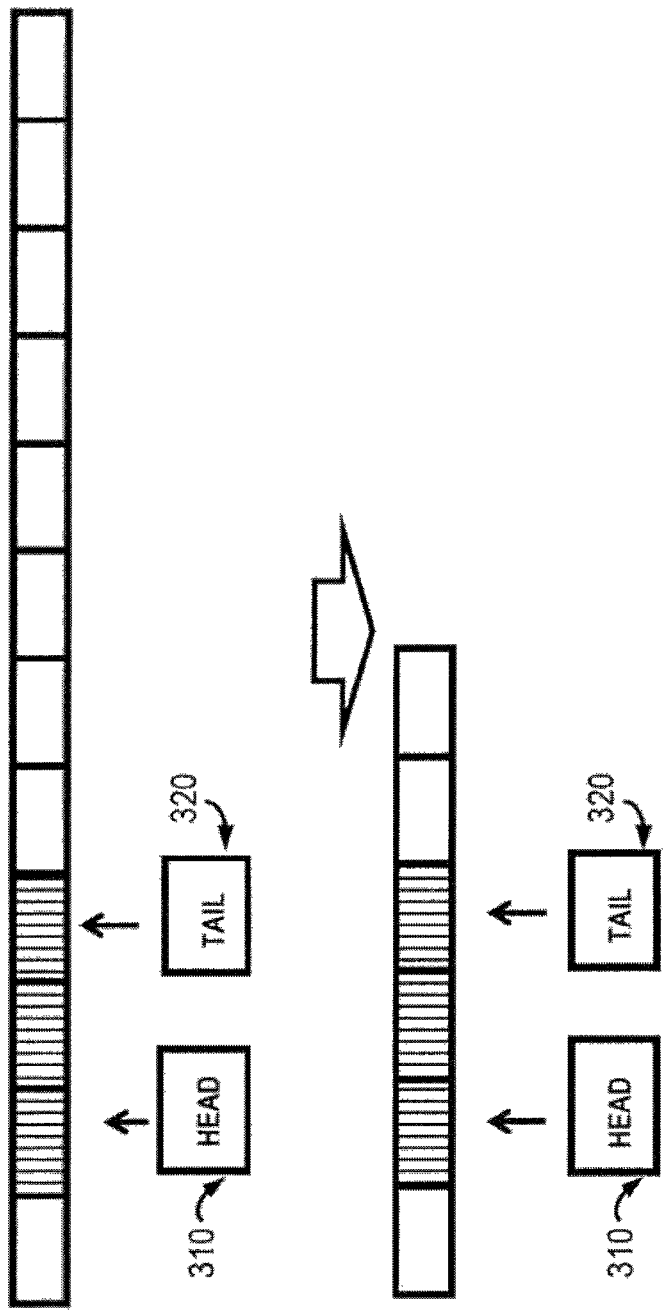
FIG. 7 shows a schematic diagram of a first manner of removing flash blocks for the method 400 according to the embodiments of the present disclosure.
Figure 8:
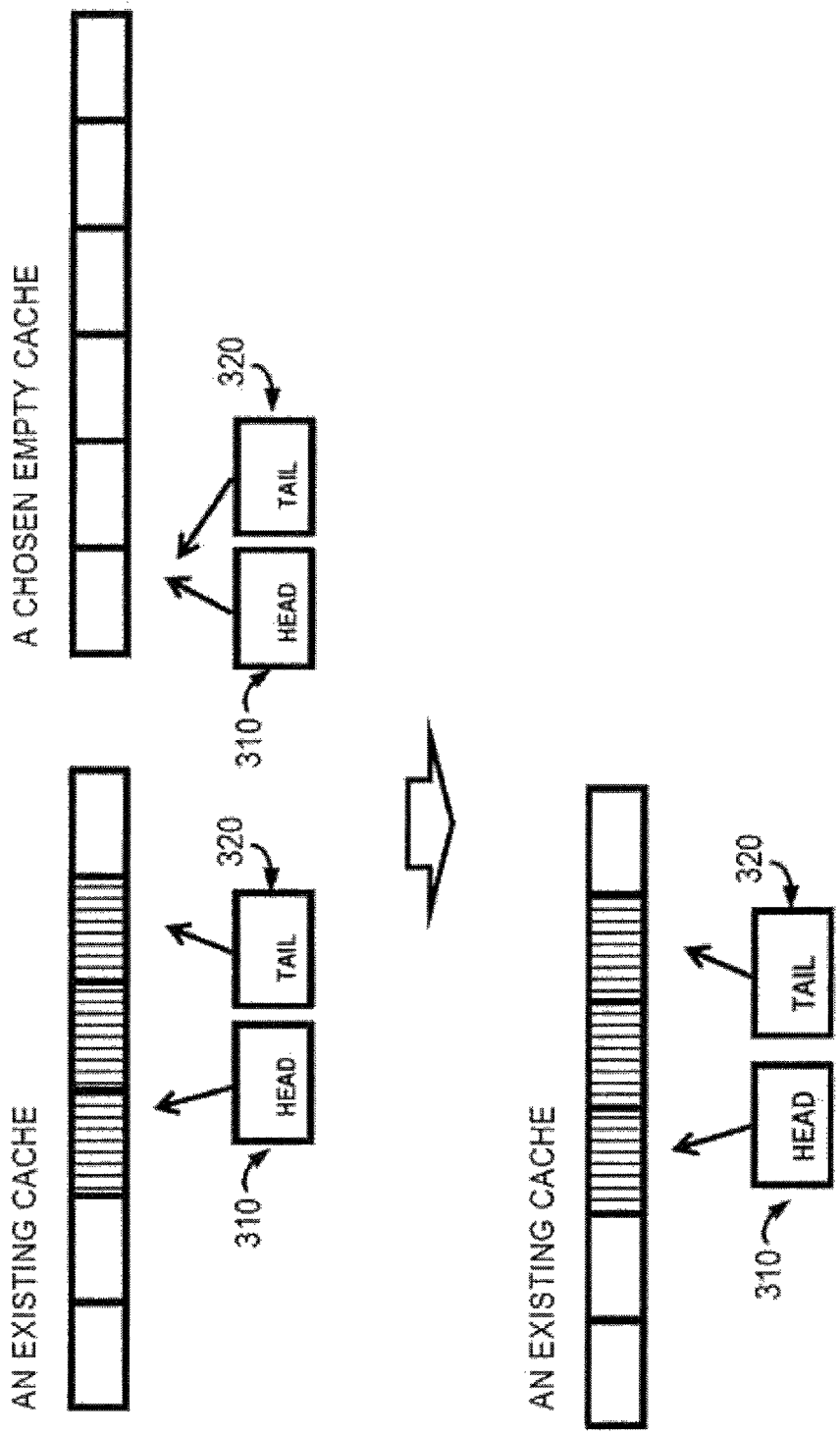
FIG. 8 shows a schematic diagram of a second manner of removing flash blocks for the method 400 according to the embodiments of the present disclosure.

As stated above, according to some embodiments of the present disclosure, after additional flash blocks are allocated to the cache, the allocated additional flash blocks may be configured in the manner as shown in FIG. 5 or FIG. 6. Therefore, accordingly, when at least one unused flash block is removed from the cache, the flash block may be removed in the manner as shown in FIG. 7 or FIG. 8, wherein the removing in FIG. 7 corresponds to the allocation in FIG. 5 and the removing in FIG. 8 corresponds to the allocation in FIG. 6. Therefore, FIGS. 7 and 8 may be considered as elaboration or complement to block 410 in FIG. 4.

FIG. 7 shows a schematic diagram of a first manner of removing flash blocks for the method 400 according to the embodiments of the present disclosure.

As shown by FIG. 7, when the flash block is removed, it is removed from the back of the cache. This process may include the following acts:

1) Checking the layout of the cache, and determining that the cache is not full and the back of the cache includes unused flash blocks.
2) Locking the whole datalog.
3) Removing the unused flash blocks from the back of the cache. According to some embodiments of the present disclosure, when the cache is the initial size, the operation of removing the unused flash blocks is not performed to avoid affecting the initial predetermined performance of the cache.
3) Unlocking the whole datalog.
4) Releasing the removed unused flash blocks. It shall be understood that according to some embodiments of the present disclosure, to realize dynamic allocation of flash blocks among different file systems of the unified storage, it is possible not to release the removed unused flash blocks immediately; instead, when the cache of another file system in the unified storage is the busy status, allocating the removed unused flash blocks to the cache of the other file system in the busy status.

It shall be understood that according to some embodiments of the present disclosure, it is also possible not to remove the unused flash blocks from the back of the cache, but from other positions (such as middle part) of the cache.

FIG. 8 shows a schematic diagram of a second manner of removing flash blocks for the method 400 according to the embodiments of the present disclosure. As shown by FIG. 8, because the previously allocated flash blocks are not combined with the original flash blocks of the original cache as a new cache, when the flash blocks are removed, it is only needed to remove unused flash blocks. This process may include the following acts:

1) Determining that the original cache is not full and the file system includes unused flash blocks. Because if the original flash block is full, then it is very likely that after the additional flash blocks are removed, the original cache becomes busy and thus, flash blocks need to be re-allocated soon afterwards, in this act, it is determined that the cache is not full. It shall be understood that when a certain condition is met (for example, this file system will no longer accept I/O requests or the originally allocated flash blocks in this file system are unused for a long time), then it is not necessary to determine that the original cache is not full.
2) Choosing at least one unused flash block.
3) Releasing the chosen unused flash block; if the released flash block is the last additional flash block, then reducing the number of total datalog space counters. It shall be understood that according to some embodiments of the present disclosure, to realize dynamic allocation of flash blocks among different file systems of the unified storage, it is possible not to release the removed unused flash blocks immediately, but to allocate the chosen unused flash blocks to the cache of another file system that is in the busy status when the cache of the other file system in the unified storage is in the busy status.

Through the above depiction, it can be seen that the technical solution according to the embodiments of the present disclosure may have multiple advantages. For example, for the busy file system in the unified storage system, it is possible to allocate additional flash blocks (as datalog spaces) according to its busy status to cache more incoming I/O data at a high speed to realize its higher throughput. Particularly, during heavy I/O load, there is sufficient datalog space to cache incoming I/O requests at a high speed. More incoming I/O requests may be cached in the datalog of PFDC at a high speed for further internal linking compression or returning quickly after duplications are deleted. The throughput of the related file systems will be improved significantly.

Besides, for idle file systems in the unified storage, their flash blocks (as datalog spaces) will be released for use by other busy file systems. In addition, flash blocks of the overall storage (as datalog spaces) can be utilized sufficiently so as to achieve a dynamic balance between saving resources of flash blocks and better I/O performance. Particularly, from the perspective of the whole storage system, some additional flash blocks may be allocated to all the file systems based on their busy status and utilized sufficiently to protect the hardware input. Moreover, as a flexible resource management method, a technology for contending with parallel flexible technology used in cloud computing is provided.

Figure 9:
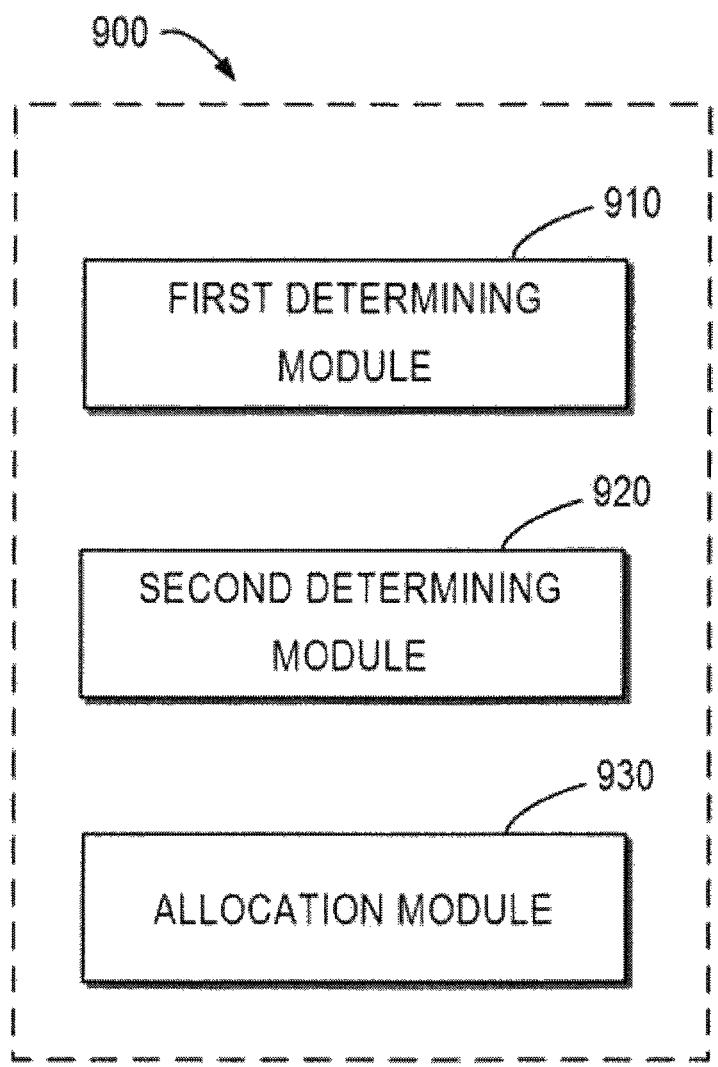
FIG. 9 shows a block diagram of an apparatus 900 for storage management according to the embodiments of the present disclosure.

FIG. 9 shows a block diagram of an apparatus 900 of storage management according to the embodiments of the present disclosure. For example, the method 400 of storage management as shown by FIG. 4 may be implemented by the apparatus 900. As shown by FIG. 9, the apparatus 900 may include a first determining module 910 configured to determine a queuing condition of I/O requests of a cache of a first file system in a storage, wherein the cache includes at least one flash block. The apparatus 900 may further include a second determining module 420 configured to determine a load condition of the cache based on the queuing condition of the I/O requests. The apparatus 900 may further include an allocation module 930 configured to, in response to determining that the cache is in a busy status, allocate to the cache at least one additional flash block from a second file system in the storage, wherein the second file system is different from the first file system.

For the sake of clarity, some optional modules of apparatus 900 are not shown in FIG. 9. However, it is to be understood that various features as described with reference to FIGS. 1-4 are likewise applicable to apparatus 900. Besides, various modules in apparatus 900 may be hardware modules or software modules. For example, in some embodiments, the apparatus 900 may be partially or completely implemented using software and/or firmware, for example, implemented as a computer program product embodied on a computer readable medium. Alternatively or additionally, the apparatus 900 may be partially or completely implemented based on hardware, for example, implemented as an integrated circuit (IC) chip or an application-specific integrated circuit (ASIC), a system on chip (SOC), a field programmable gate array (FPGA), and so on. The scope of the present disclosure is not limited in this aspect.

Figure 10:
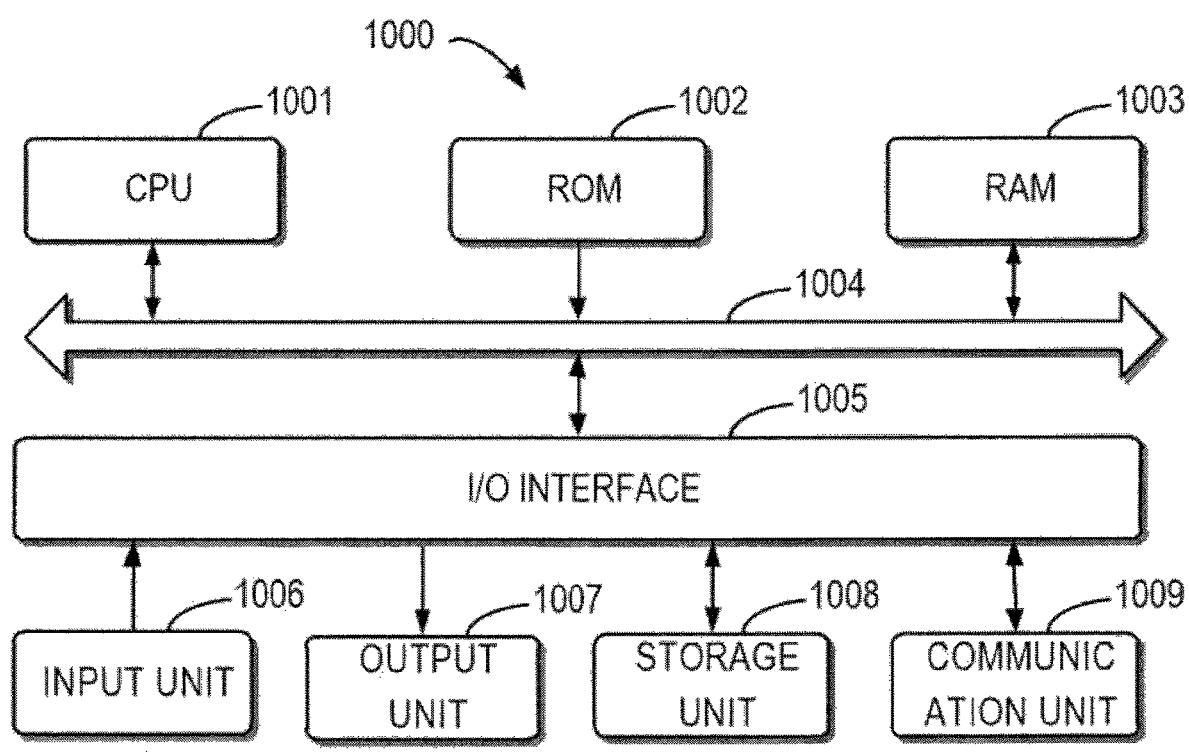
FIG. 10 shows a schematic block diagram of an example device 1000 that can be used to implement embodiments of the present disclosure.

FIG. 10 shows a schematic diagram of an example device 1000 that can be used to implement embodiments of the present disclosure. As shown in the figure, the device 1000 includes a central processing unit (CPU) 1001 which can execute various appropriate actions and processing based on the computer program instructions stored in a read-only memory (ROM) 1002 or the computer program instructions loaded into a random access memory (RAM) 1003 from a storage unit 1008. Various programs and data required for the device 1000 to operate can also be stored in the RAM 1003. CPU 1001, ROM 1002 and RAM 1003 are connected to each other via a bus 1004 to which an input/output (I/O) interface 1005 is also connected.

A plurality of components in the device 1000 are connected to the I/O interface 1005, comprising: an input unit 1006, for example, keyboard, mouse and the like; an output unit 1007, for example, various types of displays, loudspeakers and the like; a storage unit 1008, such as magnetic disk, optical disk and the like; and a communication unit 1009, for example, network card, modem, wireless communication transceiver and the like. The communication unit 1009 allows the device 1000 to exchange information/data with other devices through computer networks such as Internet and/or various telecommunication networks.

Each procedure and processing described above, for example, method 400, can be executed by a processing unit 1001. For example, in some embodiments, the method 300 can be implemented as computer software programs, which are tangibly included in a machine-readable medium, for example, storage unit 1008. In some embodiments, the computer program can be partially or completely loaded in and/or installed onto the device 1000 via ROM 1002 and/or the communication unit 1009. When the computer program is loaded to RAM 1003 and executed by CPU 1001, one or more steps of the above described method 300 are implemented.

The present disclosure may be a method, an apparatus, a system and/or a computer program product. The computer program product can include a computer-readable storage medium loaded with computer-readable program instructions thereon for executing various aspects of the present disclosure.

The computer-readable storage medium can be a tangible device capable of holding and storing instructions used by the instruction-executing device. The computer-readable storage medium can be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, for example, a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (for example, optical pulses passing through fiber-optic cables), or electric signals transmitted through electric wires.

The computer-readable program instructions described here can be downloaded from the computer-readable storage medium to various computing/processing devices, or to external computers or external storages via Internet, local area network, wide area network and/or wireless network. The network can include copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instruction set architecture (ISA) instructions, machine instructions, machine-related instructions, microcodes, firmware instructions, state setting data, or a source code or target code written by any combinations of one or more programming languages comprising object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (for example, via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA), for example. The electronic circuit can execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combinations of various blocks thereof can be implemented by the computer-readable program instructions.

The computer-readable program instructions can be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions can also be stored in the computer-readable storage medium. These instructions enable the computer, the programmable data processing device and/or other devices to operate in a particular way, such that the computer-readable medium storing instructions can include a manufactured article that includes instructions for implementing various aspects of the functions/actions specified in one or more blocks of the flow chart and/or block diagram.

The computer-readable program instructions can also be loaded onto computers, other programmable data processing devices or other devices, so as to execute a series of operational steps on the computers, other programmable data processing devices or other devices to generate a computer implemented process, such that the instructions executed on the computers, other programmable data processing devices or other devices can realize the functions/actions specified in one or more blocks of the flow chart and/or block diagram.

The flow chart and block diagram in the accompanying figures present possible architecture, functions and operations realized by the system, method and computer program product according to a plurality of embodiments of the present disclosure. In this regard, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method of storage management, comprising:
   determining a queuing condition of I/O requests of a cache of a first file system in a storage, the cache including at least one flash block;
   determining a load condition of the cache based on the queuing condition of the I/O requests;
   in response to determining that the cache is in a busy status, allocating to the cache at least one additional flash block from a second file system in the storage, the second file system being different from the first file system;
   in response to determining, based on the queuing condition of the I/O requests, that the cache is in an idle status, determining whether the cache includes unused flash blocks; and
   in response to the cache including the unused flash blocks, removing at least one of the unused flash blocks from the cache.

2. The method according to claim 1, wherein determining the load condition of the cache comprises:
   in response to the number of the I/O requests queued for the cache reaching a first threshold number, determining that the cache is in the busy status.

3. The method according to claim 1, wherein determining the load condition of the cache comprises:
   in response to the number of I/O requests queued for the cache reaching a second threshold number for a first period of time that exceeds a predetermined length, determining that the cache is in the busy status.

4. The method according to claim 1, wherein the at least one flash block includes N flash blocks, and allocating the at least one additional flash block to the cache comprises:
   allocating M additional flash blocks to the cache, M and N being natural numbers and M being a multiple of N.

5. The method according to claim 1, wherein determining the load condition of the cache comprises:
   in response to absence of I/O requests queued for the cache for a second period of time, determining that the cache is in the idle status.

6. The method according to claim 1, wherein determining the load condition of the cache comprises:
   in response to the number of the I/O requests completed for the cache for a third period of time failing to reach a third threshold number, determining that the cache is in the idle status.

7. The method according to claim 1, wherein the at least one flash block includes a plurality of flash blocks, the method further comprising:
   in response to determining that the number of unused flash blocks in the plurality of flash blocks exceeds a predetermined number, removing the predetermined number of unused flash blocks from the cache.

8. The method according to claim 1, wherein removing at least one of the unused flash blocks from the cache includes:
   re-allocating an unused flash block from the cache of the first file system to a different cache, the different cache belonging to a file system that is different from the first file system.

9. The method according to claim 8 wherein the file system that is different from the first file system is a particular file system currently having the busy status; and
   wherein re-allocating the unused flash block includes:
      removing the unused flash block from a back of the cache and allocating the unused flash block to the particular file system currently having the busy status.

10. A device for storage management, comprising:
    at least one processing circuit; and
    at least one memory coupled to the at least one processing circuit and storing instructions executable by the at least one processing circuit, the instructions, when executed by the at least one processing circuit, causing the device to perform acts including:
  determining a queuing condition of I/O requests of a cache of a first file system in a storage, the cache including at least one flash block;
  determining a load condition of the cache based on the queuing condition of the I/O requests;
  in response to determining that the cache is in a busy status, allocating to the cache at least one additional flash block from a second file system in the storage, the second file system being different from the first file system;
  in response to determining, based on the queuing condition of the I/O requests, that the cache is in an idle status, determining whether the cache includes unused flash blocks; and
  in response to the cache including the unused flash blocks, removing at least one of the unused flash block from the cache.

11. The device according to claim 10, wherein determining the load condition of the cache comprises:
  in response to the number of the I/O requests queued for the cache reaching a first threshold number, determining that the cache is in the busy status.

12. The device according to claim 10, wherein determining the load condition of the cache comprises:
  in response to the number of I/O requests queued for the cache reaching a second threshold number for a first period of time that exceeds a predetermined length, determining that the cache is in the busy status.

13. The device according to claim 10, wherein the at least one flash block includes N flash blocks, and allocating the at least one additional flash block to the cache comprises:
  allocating M additional flash blocks to the cache, M and N being natural numbers and M being a multiple of N.

14. The device according to claim 10, wherein determining the load condition of the cache comprises:
  in response to absence of I/O requests queued for the cache for a second period of time, determining that the cache is in the idle status.

15. The device according to claim 10, wherein determining the load condition of the cache comprises:
  in response to the number of the I/O requests completed for the cache for a third period of time failing to reach a third threshold number, determining that the cache is in the idle status.

16. The device according to claim 10, wherein the at least one flash block includes a plurality of flash blocks, the acts further including:
  in response to determining that the number of unused flash blocks of the plurality of flash blocks exceeds a predetermined number, removing the predetermined number of unused flash blocks from the cache.

17. A computer readable storage medium having computer readable program instructions stored thereon, the computer readable program instructions, when executed by a processing circuit unit, causing the processing circuit to perform the steps of:
  determining a queuing condition of I/O requests of a cache of a first file system in a storage, the cache including at least one flash block;
  determining a load condition of the cache based on the queuing condition of the I/O requests;
  in response to determining that the cache is in a busy status, allocating to the cache at least one additional flash block from a second file system in the storage, the second file system being different from the first file system;
  in response to determining, based on the queuing condition of the I/O requests, that the cache is in an idle status, determining whether the cache includes unused flash blocks; and
  in response to the cache including the unused flash blocks, removing at least one of the unused flash blocks from the cache.

18. The computer readable storage medium of claim 17, wherein determining the load condition of the cache comprises:
  in response to the number of the I/O requests queued for the cache reaching a first threshold number, determining that the cache is in the busy status.

19. The computer readable storage medium according to claim 17, wherein determining the load condition of the cache comprises:
  in response to the number of I/O requests queued for the cache reaching a second threshold number for a first period of time that exceeds a predetermined length, determining that the cache is in the busy status.

20. The computer readable storage medium according to claim 17, wherein the at least one flash block includes N flash blocks, and allocating the at least one additional flash block to the cache comprises:
  allocating M additional flash blocks to the cache, M and N being natural numbers and M being a multiple of N.

* * * * *